July 20, 1971     P. DIEFFENBACH     3,594,260
ARTIFICIAL SHRUBBERY AND METHOD OF MANUFACTURING THE SAME
Filed Jan. 16, 1970     4 Sheets-Sheet 1
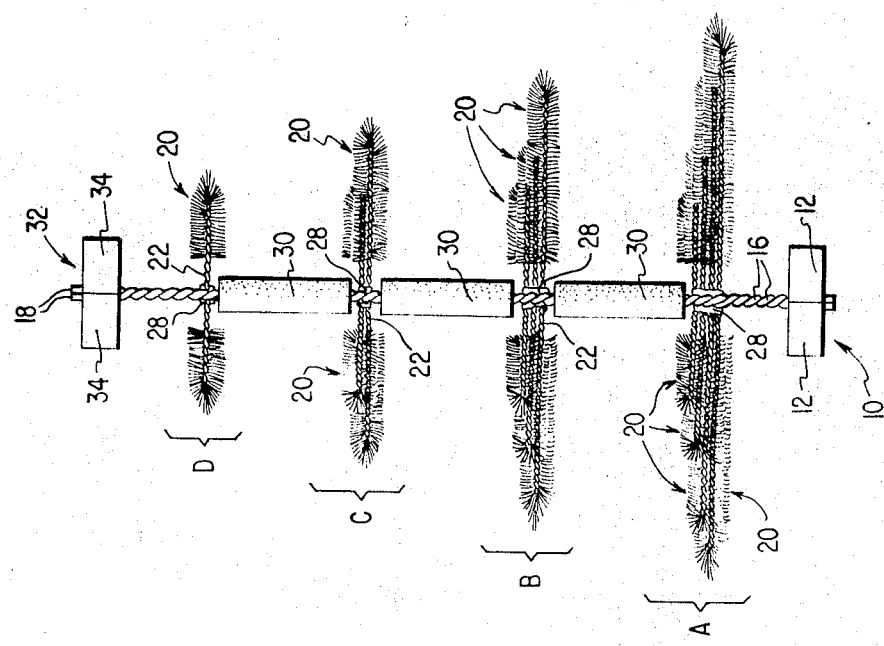
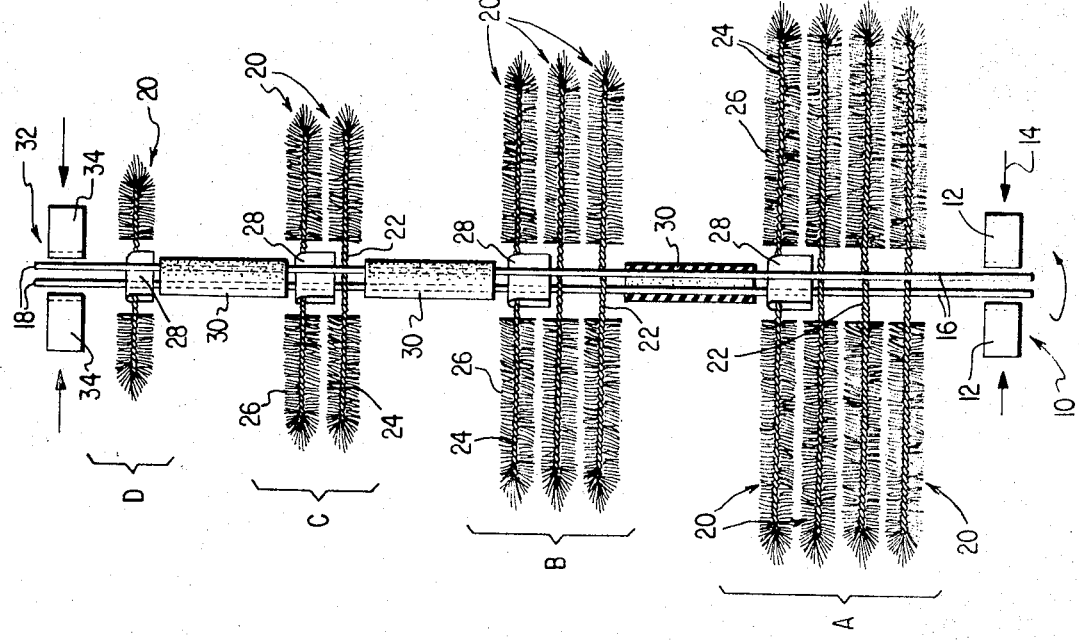
INVENTOR
PERCY DIEFFENBACH
ATTORNEYS.

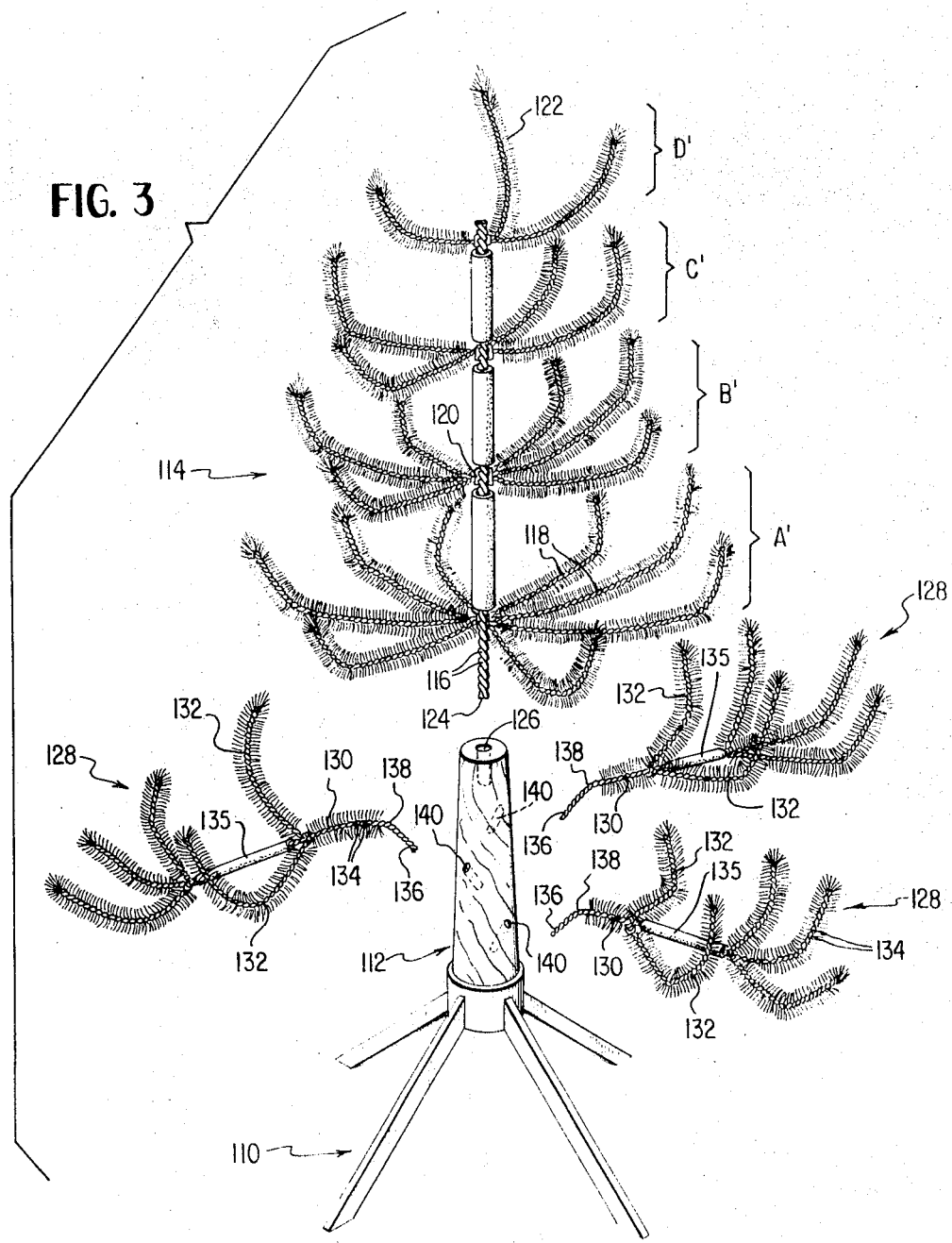

July 20, 1971          P. DIEFFENBACH          3,594,260
ARTIFICIAL SHRUBBERY AND METHOD OF MANUFACTURING THE SAME
Filed Jan. 16, 1970          4 Sheets-Sheet 3
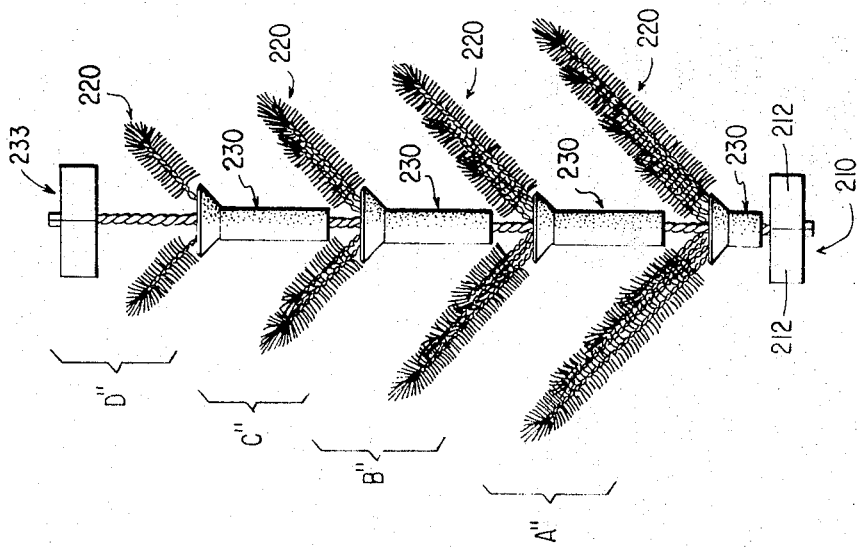
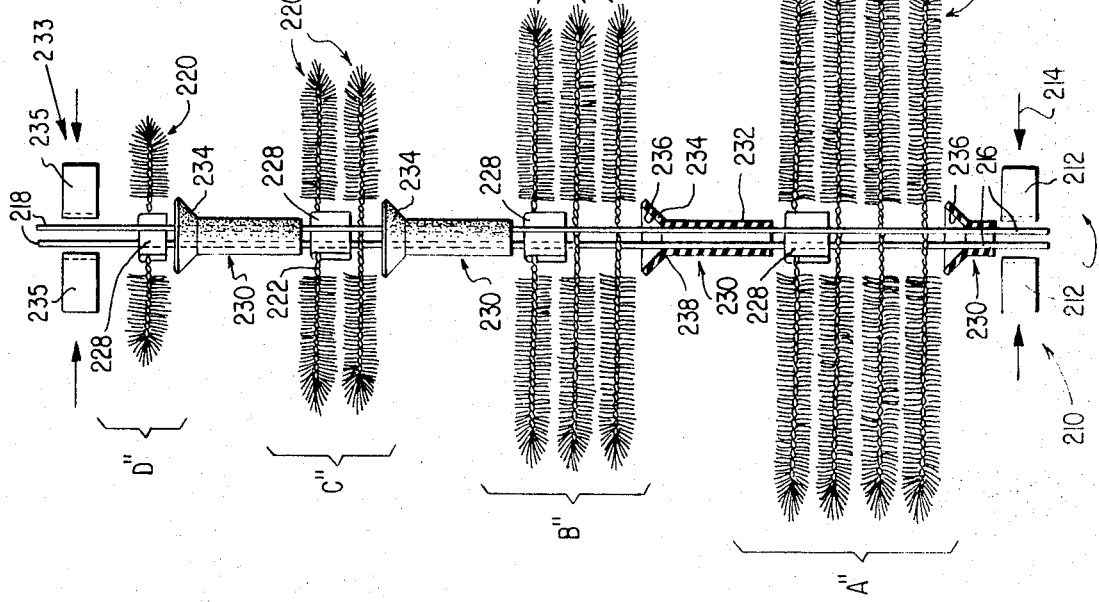
INVENTOR
PERCY DIEFFENBACH
BY *Sughrue, Rothwell, Mion, Zinn & Macpeak*
ATTORNEYS July 20, 1971 P. DIEFFENBACH 3,594,260
ARTIFICIAL SHRUBBERY AND METHOD OF MANUFACTURING THE SAME
Filed Jan. 16, 1970 4 Sheets-Sheet 4

INVENTOR
PERCY DIEFFENBACH
BY Sughrue, Rothwell, Mion, Zinn & Macpeak
ATTORNEYS

United States Patent Office 3,594,260
Patented July 20, 1971

3,594,260
ARTIFICIAL SHRUBBERY AND METHOD OF MANUFACTURING THE SAME
Percy Dieffenbach, Main and Lincoln Sts., Blakely, Pa. 18447
Continuation-in-part of application Ser. No. 881,803, Dec. 3, 1969, which is a continuation-in-part of application Ser. No. 779,916, Nov. 29, 1968. This application Jan. 16, 1970, Ser. No. 3,414
Int. Cl. A41g 1/00
U.S. Cl. 161—24                                15 Claims

ABSTRACT OF THE DISCLOSURE

Stiffly flexible artificial limb members are inserted between a pair of stiffly flexible stem members which extend parallel to and adjacent each other with flexible spacer tubes slid onto the stem members to space the limbs at longitudinal positions. One end of the assembly is held in a fixed chuck and the other end held within a second chuck which is rotated with respect to the first chuck to form a completed assembly. The tubes may have their upper ends flared to define outwardly inclined surfaces to properly orient the limbs during twisting of the stem members. Multiple tipped limb assemblies of this type may be removably coupled to a preformed trunk member carrying a plurality of radial holes for receiving the same.

Alternatively, each multiple tip limb assembly may be provided with a hooked end at the top which is removably coupled to the preformed trunk such that the main limb portion extends downwardly and outwardly therefrom, of the trunk with the cross limbs directed radially outwardly and to one side of the main limb to form frusto-conical sectors of generally conical shrubbery assembly.

---

This is a continuation-in-part of application Ser. No. 881,803, filed Dec. 3, 1969 now abandoned, and entitled "Artificial Shrubbery and Method of Manufacturing the Same," which in turn is a continuation-in-part of application Ser. No. 779,916 filed Nov. 29, 1968, now abandoned, and identically entitled.

BACKGROUND OF THE INVENTION

Field of the invention

This invention relates to the manufacture of artificial shrubbery and more particularly, to the manufacture of artificial trees which may be used for indoor or outdoor use, which are extremely rugged and require little or no assembly time.

Description of the prior art

Artificial shrubbery, and in particular, artificial trees have recently come into vogue and in many areas are actually replacing the natural trees due to local scarcity and relatively high cost of shipping trees in cut or in ball form from the more plentiful areas for seasonal use or planting, either indoors or outdoors. In the past, artificial shrubbery, including trees, have been constructed of paper, wood, plastic and metal, or combination of the same.

One type of artificial tree which is virtually replacing the aluminum or lightweight metal tree and the soft vinyl tree is the type shown in U.S. Pat. 3,278,364 to applicant, entitled "Artificial Christmas Tree," which issued Oct. 11, 1966.

The artificial tree construction of the above patent makes use of a relatively small diameter rod or post normally formed of wood which acts as the vertically extending tree trunk. The rod is provided with a series of radial holes which are diagonally drilled on an angle to the axis of the trunk and extend upwardly for receiving the inner end of multiple limb assemblies of the twisted wire and plastic filament type. The majority of the limb assemblies are preferably formed with one central or main limb and at least one cross limb, both formed of twisted wires, which hold a great number of filaments at right angles to the axis of the twisted wires in the manner of a conventional brush. The limbs and the filaments are colored to represent a natural coniferous tree, preferably green or blue green, and the outer ends of the main limb and cross limbs have their filaments tapered to simulate a natural tree whose tip needles are much shorter than those inwardly thereof. The outer ends of the cross limbs and the outer end of the main limb are bent upwardly, while the inner terminal end of the main limb is preferably bent downwardly at a slight angle to ensure that regardless of the imbalance caused by the presence of the cross limbs, the main limb will not rotate about its axis due to the presence of the bent portion occurring between the terminal portion which is inserted within the diagonal hole of the trunk and the point where the cross limb contacts the main limb element and is wrapped normally thereabout.

In such a case, any tendency for the imbalance which would cause or tend to cause the cross limb to rotate the main limb element about the axis of the main limb portion would also tend to cause the bent inner end of the main limb to rotate about the same axis which, of course, it is prevented from doing because of its presence within the inclined radial hole. This unique feature allows the tree to be readily assembled and disassembled for seasonal use, but allows the assembled tree to have the bushy appearance so prevalent in nature. While it is preferred that all of the limb assemblies have cross limbs and a bent inner end for attachment in this manner, any limb not having cross limbs does not require bending at the point of insertion within the inclined radial hole and, of course, the tree top has its terminal end of the main limb element inserted within a vertical extending hole coinciding with the axis of the rod or tree trunk.

While the artificial tree construction of this type has attained unbelievable commercial success and is fast replacing the natural coniferous tree, both for indoor and outdoor use, seasonal or otherwise, the presence of many of the drilled holes in the rod and the requirement of a like number of removable limb assemblies requires extensive time in both assembling and disassembling this knock-down tree structure. Further, since a natural tree has an overall conical configuration with the lower limb extending away from the trunk to a greater distance than those near the top, the various limbs must be marked so that the tapered appearance to the tree may be readily created during each time that the tree is assembled by accurate placement of tree limbs of given length to a related series of radial holes at spaced longitudinal positions along the tree trunk. This requires color coding of the limb tips, etc., as well as the inclusion of a rather detailed set of instructions for assembly of the artificial tree. Further, there is some tendency for the inclined radial holes in the tree trunk to become enlarged and in fact, the trunk may split due to the forcing of the limbs into their terminal receiving holes. There is always the case that the tree may be accidentally knocked over, in which case, many of the limbs may actually fall out of their terminal end receiving holes.

SUMMARY OF THE INVENTION

The present invention is directed to an improved artificial shrub and the method of its manufacture, which employs, in similar fashion to applicant's prior patent, preferably, artificial limbs formed of twisted wire and filaments, that is, "brush stock" which quite closely simulates the needled branches of a natural coniferous tree. The shrub, which is preferably in tree form, is manufactured by placing the ends of the two or more stiffly flexible stem members in longitudinal, parallel positions within a first chuck member and inserting stiffly flexible limb members between the parallel stem having portions extending to either side and separating limb members longitudinally of the parallel stem members by flexible tube sections which are slid onto the stem members from the free ends toward the first chuck member. In alternate fashion, an assembly is built up and the open ends of the stem members are then placed in a second chuck. One chuck rotates with respect to the other to intertwine the stems and to securely lock the limb elements in longitudinal, spaced positions defined by the flexible tube sections which act as spacers. The tubular spacers may have their ends directed toward the tree top, flared outwardly and upwardly to define a frusto conical internal guide surface which automatically orients the limbs at inclined positions when intertwisting the stem members.

Preferably, a complete tree is formed in this manner, although one tree section having multiple, longitudinally spaced limbs may be so formed and may be carried by an axial hole formed in the upper end of a rod-like trunk member in similar fashion to the referred to patent. Further a series of limb assemblies may be formed in the above manner having cross limbs separated by tube spacers, in which case, the inner terminal end of the twisted stem members for each limb assembly is bent downwardly in identical fashion to the referred to patent with its terminal end received within an inclined radial hole of the rod-like trunk member to complete an artificial tree assembly in which the lower, insertable branches are prevented from rotating due to cross limb imbalance because of the bend intermediate of the last cross limb and the terminal end received within the inclined radial hole of the trunk.

Preferably, the portions of the limbs which pass between the stiffly flexible stem member forming the intertwisted trunk are wrapped with an insulator sheet prior to insertion and twisting to electrically insulate the limbs from the stem. Where the limbs are formed of filaments captured by twisted wire, the portion of the twisted wires extending between the stem members are preferably bare to facilitate coupling of the limbs to the intertwisted stem member and proper positioning of the insulator sheet with respect thereto.

Alternatively, a complete tree or artificial shrub is formed by providing a cylindrical trunk member with a plurality of short tubular members circumferentially spaced about and fixed to the trunk member with their axis parallel thereto. Each preformed limb assembly has its main limb at the top reversely bent to form a hook and cross limbs, preferably separated by tube spacers extend laterally outward of the main limb and to one side only to define a frusto-conical shrubbery sector. The hooked end of each limb assembly is inserted within the open top of a short tubular member to provide a circumferential array of the frusto-conical sectors to form the major base portion of the otherwise conical shrub. Preferably one tree top having multiple longitudinally spaced limbs has its bottom end extending within an axial hole in the upper end of the trunk member. The trunk member in this case may, in fact, comprise a hollow tube. Preferably, the short tubular members have inclined end faces at the top, which incline downwardly and outwardly so that the hook end of the limb assembly naturally centers at predetermined circumferential positions through gravity orientation of the same curved over the lowermost edge of the tubular member top opening.

BRIEF DESCRIPTION OF THE DRAWINGS

FIG. 1 is a partially schematic, elevational view of the composite shrubbery component with the stem members of the shrubbery component in position prior to intertwisting of the wire stem members to illustrate the method of manufacture of the same.

FIG. 2 is a similar elevational view to that of FIG. 1 showing the shrubbery component subsequent to intertwisting of the stem members.

FIG. 3 is an exploded perspective view of an improved artificial shrubbery assembly incorporating an insertable tree top and a plurality of lower limbs formed by the method of manufacture of the present invention.

FIG. 4 is a partially schematic, elevational view of a composite shrubbery assembly with the stem members of the shrubbery component in position prior to intertwisting of the wire stem members, to illustrate the method of manufacture of an alternate form of the present invention.

FIG. 5 is a similar elevational view to that of FIG. 4 showing the shrubbery component subsequent to intertwisting of the stem members.

DESCRIPTION OF PREFERRED EMBODIMENTS

Figure 6:
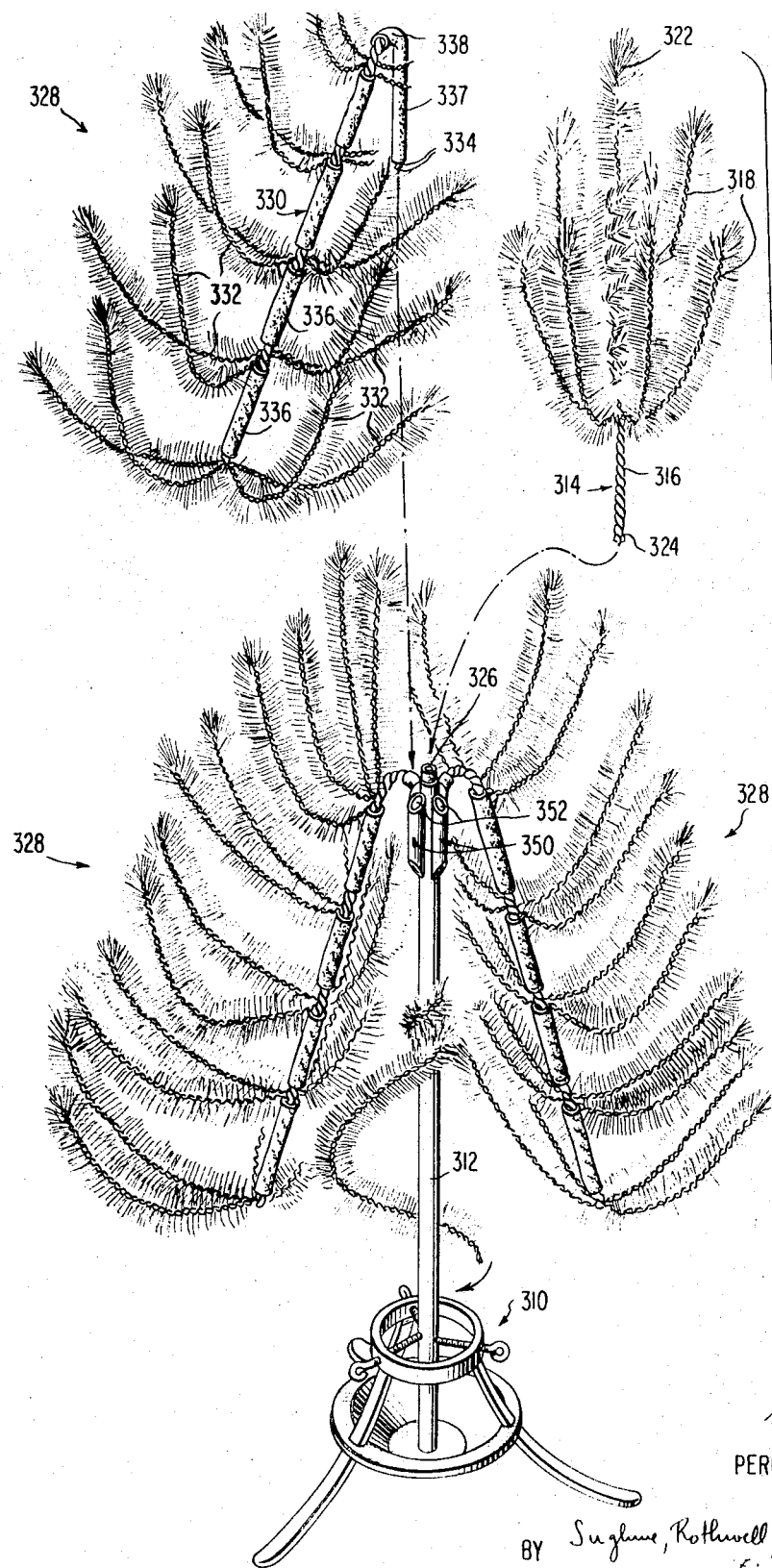
FIG. 6 is an exploded, perspective view of an alternate embodiment of the improved artificial shrubbery assembly incorporating an insertable tree top and a plurality of lower limbs having hooked ends and formed by the method of manufacture of the present invention.

Referring to the drawings, artificial shrubbery in the form of an artificial coniferous tree is manufactured under the method of the present invention by the employment of a lower chuck, indicated schematically at 10, having opposed jaws 12, which, as indicated by arrow 14, may be opened to receive one end of a pair of elongated stem members 16 which preferably comprise stiffly flexible wire rods, which may be one-half or more in diameter for relatively long trees up to 15 feet, but preferably less than one eight of an inch in diameter. Initially, the stem members or rods 16 are inserted within the chuck 10 with their open ends 18 extending vertically upward and slightly parted as indicated, so that the individual limbs or branches 20 may slide in between the stem members 16. If necessary, the individual limbs 20 may be positioned between the stem members 16 by parting the free ends 18 slightly and moving the limbs downwardly therebetween. Although two stem members 16 are shown, three or more stem members may be employed, in which case, the limbs pass between any two stem members. Assuming, for instance, that it is desired to produce an artificial tree of some 10 feet in height, the initial length of the stem members or rods 16 may be as much as 11 or 12 feet. Obviously, in order to produce an overall tapered tree with wider branches at the bottom and narrower branches at the top, the lengths of the individual branches or limbs would vary such that the lower branches indicated by group A may be of 4 or 5 feet in width. Preferably, the individual branches or limbs 20 are formed identically from identical brush stock as are the limbs in the referred to patent, in which case, two or more twisted wires act to embrace a great number of plastic filaments therebetween, with wire or plastic or both being colored green to provide a limb akin to a natural evergreen or coniferous tree. It is preferred that the individual limbs extend generally equidistant to either side of the stem members 16 which receive the same and that the central portion 22 of each limb be devoid of filaments so as to facilitate the insertion of the limbs within the spread stem members. Further, since the stem members 16 are preferably wire rods and therefore good conductors, as are the more flexible and smaller diameter wires forming the limbs 20 of the tree assembly, it is preferred that the single limbs or multiple tip limbs at any given position along the length of the stem members 16 be initially wrapped with a small folded sheet 28 of insulative material, such as flexible plastic, paper, etc. Further, during spreading of the stem members 16 and the downward insertion of a limb or a group of limbs, the multiple limbs may be readily grasped with the sheet 28 wrapped thereabout and moved downwardly to the appropriate position relative to the assembly. In this respect, after initially placing the cross limbs indicated as group A at the bottom of the assembly, it is necessary to position the next limb or group of limbs at some position spaced therefrom since, in a natural tree, the limbs extend outwardly from the trunk and are spaced at positions along the trunk length.

An important aspect of the present invention is the provision of tubes of flexible material intermediate of the spaced limb or limbs such as the ones shown between the lower limb grouping at A and the next group of limbs indicated at B.. Thus, in sequential fashion, a single or multiple group of limbs are slid in between the stem members while flexible spacer tubes 30 are slid onto the open ends 18 of the stem members to separate the same. If necessary, by compressing the stem members together and the tubes slid thereover with a resultant relatively tight fit between the inner surfaces of the tubes 30 and the rods 16 which they embrace. The tubes 30 may be of any color such as brown, black or green, and may be formed of flexible or resilient material such as rubber, plastic etc. In the fashion indicated in FIG. 1, there are groups of limbs at A, B, C and D, positioned between the stem members 16 and while in sequential fashion, the tube sections 30 are interspersed therebetween by sliding the same over the open ends 18 of the stem members after the previous group of limbs have been inserted.

Once this assembly is completed, a second chuck 32 is moved into position causing jaws 34 to grasp the upper ends of 18 of the stem members 16 so as to maintain the elements of the tree in assembled form prior to intertwisting of the stiffly flexible stem members. In this respect, assuming the chuck 10 remains fixed and chuck 32 is rotated as indicated in FIG. 2, a complete intertwisting of the rods 16 occurs from the chuck 10 upwardly, thereby locking the individual limbs in place at the spaced longitudinal positions defined by the tubes 30. The tubes may have a roughened exterior surface or may be grooved or configured much in the same manner as garden hose; in fact, sections of garden hose may be employed, since their surface under distortion simulates the bark of a natural tree. It is further noted that during the intertwisting of the stem members, not only are the limbs of sections A, B, C and D securely locked in position, but also the folded paper strips 28 forming the insulators remains wrapped about the limb section preventing an electrical circuit being completed between the cross limbs and the two or more stem members. If desired, the folded paper strips 28 may be of the same green color to cause them to be practically invisible upon completion of the tree. A tree assembly is then removed from the chucks by opening jaws 12 and 34, the outer ends of the limbs are bent upwardly in random fashion in random lengths much in the same fashion as the referred-to patent, to simulate an actual tree which is notable in the fact that it is not necessarily symmetric. While it is preferred that the tree be assembled with the rods extending vertically upward from a lower chuck member and insertion of the cross limbs be achieved by sliding them downwardly between the open ends of the rods, it is noted that the assembly may be achieved with the stem members oriented horizontally or at some angle between horizontal and vertical. It is important, however, that the tubes 30 be employed to properly space the single or multiple limbs in group form at the desired longitudinal positions of the assembly. Of course, the length of the tubes 30 may vary to provide closer spacing at the top or bottom of the artificial piece of shrubbery.

Reference to FIG. 3 shows a somewhat modified article of artificial shrubbery in tree form, which incorporates the features of U.S. Pat. 3,278,364. In this respect, the artificial tree consists in addition to a supporting stand 110, of a rod-like trunk member 112 formed of wood of a diameter between one inch and two and one-half inches, and of a length, for instance, on the order of two feet or more. A tree top 114 which in actuality comprises a formed structure identical to that of the embodiment shown in FIGS. 1 and 2, and in which the length may be four feet or more, consists of stiffly flexible stem members 116 which are intertwisted to capture the multiple limb assemblies A', B', C' and D'. Each limb assembly comprises one or more limbs 118 formed of twisted wire and captured filaments as described previously with respect of FIG. 1. It is noted that the individual limbs 118 are separated from the intertwisted stem members 116 by thin flexible insulation sheets 120, in similar fashion to the embodiment of FIG. 1. One end 122, of the upper limb D' is bent upwardly to form the very top stem of the tree. The bared bottom end 124 of the intertwisted stem members extends downwards in vertical alignment with the axis of the tree trunk 112 and is received within a hole 126 which extends downwardly along the trunk axis to maintain the tree top in position.

Unlike the previous embodiment, in addition to the top 114 of the tree, there is provided a plurality of preformed limb assemblies 128 which comprise a main limb portion 130 and multiple spaced cross limbs 132. The cross limbs are formed of the same twisted wire and captured filaments or "brush stock," and after being initially received within the parallel extending stiffly flexible wire limb elements 134, wire elements 134 are intertwisted. Further, in this case, a single tube 135 is positioned between the cross limbs 132 to define their axially spaced positions, prior to intertwisting of wires 134 to form a twisted wire main limb section 130. In like fashion to U.S. Pat. 3,278,364, the terminal end 136 of each main limb 130 is bent at 138 intermediate of the innermost cross limb 132 and the very end of the main limb, such that portion 136 is received with a corresponding diagonally inclined, radial hole 140 carried by tree trunk 112. By bending the inner end of the main limb element, this insures that the center of gravity of the assembly is positioned below an imaginary line passing through the axis of the inclined terminal sections within receiving hole 140 and prevents rotation of the limb assembly by the imbalance caused by the presence of the cross limbs 132. The function of the inclined hole and the bent inner end of the main limb 130 is identical to that performed in the tree construction of the referred-to Pat. 3,278,364. This arrangement allows the completion of a knockdown tree of fewer parts but operating in similar fashion to that of the referred-to patent to produce a rather bushy artificial shrubbery product which has greater stability both for indoor and outdoor use and which may be readily shipped in either totally assembled form as seen in FIG. 2 or in partially assembled form, in the manner of the FIG. 3 embodiment. Where a completed shrubbery product incorporate both a formed multiple limb top such as top 114 and a plurality of insertable limb assemblies such as 128, the stiffly flexible stem members 116 of the top wires 134 forming the main limb of the limb assemblies 128, are normally of such a diameter that they resist bending except under a heavy applied force. Thus, in this respect, the bent terminal portions 136 will remain bent in a downward direction so far as the remaining portion of the main limb 130 is concerned, to make sure that the limb sections are properly oriented with respect to the preformed inclined holes 140 of the tree trunk 112, while preventing any tendency to be inadvertently bent during assembly or transportation. In actuality, the completely formed tree such as the embodiment of FIG. 2, may be carried without packaging in a container or on trucks or other vehicles in the same manner as natural trees which are harvested for use as Christmas decorations. This greatly reduces transportation and packaging costs. Further, if the limbs should be bent during transportation they may be readily rebent to a desired position without danger of destruction or damage to the completed tree assembly and have this advantage over natural trees, wherein during transportation many of the limbs are unnecessarily broken off the tree, resulting in a lessening in value.

A modified embodiment of the composite shrubbery component of FIGS. 1 and 2 is illustrated in FIGS. 4 and 5. Again, the artificial shrubbery component, as manufactured under the method of the present invention, involves the use of a lower chuck 210 having opposed jaws 212, which as indicated by arrows 214 close laterally subsequent to receiving one end of a pair of elongated stem members 216 which preferably comprise stiffly flexible wire rods in like manner to the previously described embodiment. The open ends 218 extend vertically upward and are slightly parted as indicated in generally parallel fashion so that the individual limbs or branches 220 may be slid in between the open stem members 216. If necessary, the individual limbs 220 may be positioned between the stem members 216 by parting their free ends 218 slightly and then moving the limbs downwardly therebetween. Again, the individual branches or limbs 220 are formed identically to the limbs in the referred-to patent from "brush stock" wherein two or more twisted wires act to embrace a great number of plastic filaments with the wire or plastic both being similarly colored to provide a limb akin to a natural evergreen or coniferous tree. The individual limbs again extend equal distances to either side of the stem members 216 which receive the same with the central portions 222 of the limb devoid of filaments to facilitate the insertion of the limbs within the spread stem members. It is preferred that the limbs be initially wrapped with small folded sheets 228 of insulated material, such as flexible plastic, paper, etc. Multiple limbs may be grasped to form groups and positioned at an appropriate level within the upstanding wire rods 216.

Again, an important aspect of this embodiment is the employment of tubes of flexible material positioned intermediate of the spaced limb groups to facilitate proper positioning. However, in this case, the tubes perform the additional function of correctly orienting all of the limbs with respect to the tree trunk formed by the intertwisted rods 216 in an automatic manner while the rods are intertwisted to grasp the limbs at the spaced locations A", B", C", and D". In this respect, each of the tubes 230 has a bottom section 232 of approximately the same diameter as the tubes 30 of the embodiment of FIG. 1. But, the upper portions 234 of the tubes are flared outwardly and upwardly so as to form frusto conical inner surfaces 236 facing the limbs lying across the top of the tubes 230 and between the rods 216. Unlike the previous embodiment, one of the flared tubes 230 is positioned beneath the lowermost group A" of limbs and intermediate this group and the chuck jaws 212. Further, flared tubes 230 are positioned in each case intermediate of the limb groups A" and B", B" and C", and C" and D". The upper chuck jaws 235 are then closed as indicated by the arrows and rotation of one chuck occurs with respect to the other intertwist the wire rods 216 in the same manner as the previous embodiment. It is preferable to wrap the bare cross limb wire folded insulator sheets 228, in the manner of the previous embodiment.

Reference to FIG. 5 shows that a different configuration occurs to the end product from that of FIG. 2. Instead of having the limbs extending radially at right angles to the axis of the intertwisted rods 16 as in FIG. 2, the limb groups A", B", C" and D" now extend radially upwards from all sides, simulating a natural tree whose limbs tend to grow outwards and upwards towards the tree top. This is automatically achieved when rotating one closed chuck such as 210 with respect to the other closed chuck 233 since rotation occurs to the point where the spacer tube contacts the intermediate portions of the limbs inserted between the wire rods 216. Since the frusto conical interwall surface 236 defines a guide surface, as the wire rod ends shrink towards each other due to intertwisting of the same, the wires of the limbs 220 move into the flared ends 234 of the tubes 230, but of course the outer ends of the limbs are prevented from doing so, so that they merely incline upwardly and outwardly as shown in FIG. 5.

Thus, in the alternative embodiment there is automatically completed a shrubbery component which may be used either by itself or as a top in a composite tree structure such as that shown in FIG. 3 wherein there is no necessity to further bend the limb since the finished product already simulates a living tree. The flared tubes 230 are of course identical in all other respects to the tubes 30 employed in the manufacture of the embodiment of FIGS. 1 and 2.

Upon the completion of the product shown in FIG. 5, a completed tree assembly or shrubbery component is readily removed from the chucks by opening respective jaws 212 and 235, the intertwisted wire rods 216 may be severed just above the point where they grasp the uppermost limb or limbs identified at D" and these limbs may be then further bent upwardly if desired or the product may be shipped as is for subsequent sale.

Referring to FIG. 6 of the drawings, an alternate embodiment of the artificial shrubbery of the present invention takes the form of an artificial coniferous tree. In this respect, the artificial tree consists in addition to a supporting stand 310 of a rod-like trunk member 312 in the form of a hollow metal tube of a diameter of between one-half inch and several inches and of a length, for instance, on the order of two feet or more. A tree top 314, which in actuality comprises a formed structure identical to that of the embodiments of FIGS. 1, 2 and 3, and whose length may be four feet or more, consists of stiffly flexible stem members 316 which are intertwisted to capture one or more limbs 318 formed of twisted wire and captured filaments as described previously with respect to FIG. 3. It is noted that the individual limbs 318 may be separated from the intertwisted stem members 316 by thin, flexible insulation sheets, in similar fashion to the embodiment of FIG. 1. One end 322 of the upper limb group is bent upwardly to form the very top limb or stem of the tree. The bared bottom end 324 of the intertwisted stem members extends downwardly in vertical alignment with the axis of the tree trunk 312 and is received within open end or hole 326 of the trunk 312 which in this case, is formed by a hollow metal tube. Thus, the tree top 314 is maintained in position.

In addition to the top 314 of the tree, there are provided a plurality of preformed limb assemblies 328 which comprise a main limb portion 330 and multiple spaced cross limbs 332. The cross limbs are formed of the same twisted wire and captured filaments or "brush stock" as the previous embodiments, after being initially received within the parallel extending stiffly flexible wire limb elements 334, the wire elements 334 are intertwisted. Prior to twisting, a plurality of tubes 336 are positioned between the cross limbs 332 to define their axially or longitudinally spaced positions with respect to each limb assembly. As assembled in similar manner to FIGS. 1 and 2, the wire elements are intertwisted and form a completed limb assembly. Unlike the previous embodiments, rather than having the ends of the cross limbs or tips projecting radially therefrom, all of the cross limbs 332 are bent to one side of the completed limb assembly and the upper end of the intertwisted flexible wire main limb elements 334 is reversely bent to form a hook 337 for allowing coupling of the same in a predetermined position with respect to the tubular trunk 312. A protective sheath 338 may cover the hook 337. In this respect, the tubular trunk 312 is provided, preferably at its upper end with a plurality of circumferentially spaced short supporting tube members 350 preferably formed of metal and welded to the outside of the trunk tube 312 such that the axis of each short tube member 350 extends parallel to the axis of the trunk. Further, the tube members 350 have their upper ends 352 cut on the diagonal so that when welded to the periphery of the metal tube trunk 312 (or screwed onto a wooden trunk), the inclined upper ends 352 of the tube member 350 incline downwardly and outwardly such that, when the tube member ends 352 receive the hook or hooked ends 337 of the intertwisted main limb elements 334, since the diameter of the intertwisted rods or wires 316 is less than that of the tube members 350, the hook seeks its lowermost position within inclined open ends 352 by gravity to insure proper circumferential position of the limb assembly on the tree trunk. This is important since, due to the bending of the cross limbs in the same direction and to the same side of the main limb elements 334, each of the limb assemblies 328 takes an overall frusto conical sector form which then properly placed on the tree completes a frusto conical base portion for the assembled shrub. The hooked frusto conical sectors 328 then hang by gravity on respective sides of the trunk member to form the tree with the exception of tree top 314. Instead of employing a plurality of circumferentially spaced tubular members on the outside of the trunk, the diameter of the hollow tube forming trunk 312, may be enlarged and circular holes provided as desired through which are inserted the hooked upper ends 337 of the limb assemblies 328. Alternatively, other arrangements may be made for allowing the hooked sector sections limb sectors 328 to hang in proper angularly spaced position on the outside of the trunk to form the full frusto conical array. With rigid rods forming the main limb 330, from hooked end 337, the remainder of the main limb extends downwardly and outwardly. This allows uniform length cross limbs 332 to be employed while providing a full taper to the frusto conical sectors 328 without sacrificing necessary "bushiness" to the assembled shrub.

Figure 7:
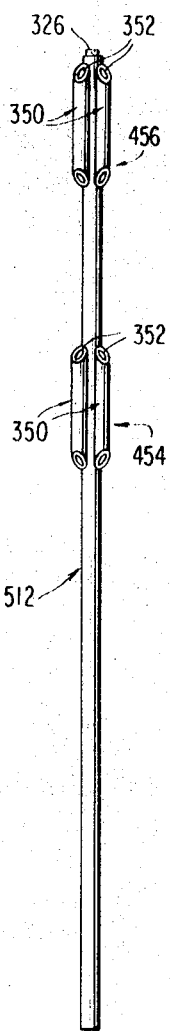
FIG. 7 is an elevational view of an alternate trunk member carrying a plurality of circumferentially arranged short tubular members fixed thereto in multiple, longitudinally spaced arrays.

Turning to FIG. 7, there is shown an alternate form of hollow metal tube trunk 512 which in this case is of a length of five to six feet and carries at longitudinally spaced positions, circumferential arrays 454 and 456 of short tubular members 350 welded to the outside thereof with their axis parallel to the axis of the tubular trunk 512. Note again, that the upper ends 352 of the short tubular members incline outwardly and downwardly to insure proper circumferential positioning of the hooked ends of limbs assemblies (not shown) identical to limb assemblies 328 of the embodiment of FIG. 6. Again, the open upper end 326 of the tubular trunk member receives a preformed top (not shown) such as top 114 of the embodiment of FIG. 3.

With four short tubular sections forming a circumferential array at the upper end of a given trunk member, a tree may be constructed of four limb assemblies plus a tree top and take literally seconds to assemble rather than many minutes needed for trees of relatively large height of the type shown in the referred-to Pat. 3,278,364 of applicant. Instead of having the short tubular members in a complete circumferential array, they may be randomly fixed to the trunk and perhaps in spiral form, at differing longitudinal positions to provide a random dispersion of the limb assemblies 328, especially for trunks of the type shown in FIG. 7 for shrubs of increased height. After assembly, the trunk may be wrapped to camouflage the same.

While the invention has been particularly shown and described with reference to the preferred embodiments thereof, it will be understood by those skilled in the art that various changes in form and detail may be made therein without departing from the spirit and scope of the invention.

What is claimed is:

1. In a method of manufacturing artificial shrubbery of the type where a plurality of stiffly flexible stem members are intertwisted to capture stiffly flexible stem members at spaced longitudinal positions, the improvement comprising: maintaining said limb members at predetermined locations between said stiffly flexible stem members prior to intertwisting of said stem members by alternately inserting at least one limb member between said stem members and commonly sliding spacer tubes on to the open ends of said stem members and into contact with the last previously inserted limb member.

2. The method of manufacturing artificial shrubbery as claimed in claim 1 further including the step of locally wrapping said limb members with a sheet of insulation prior to inserting the limb members between the stem members with the insulation in contact with the stem members.

3. The method of manufacturing artificial shrubbery as claimed in claim 2 wherein said step of wrapping said limb members comprises folding a thin, relatively narrow sheet of insulation over said limb members to cover the top and sides of said limb members prior to insertion of the same between said stem members.

4. The method of manufacturing artificial shrubbery as claimed in claim 1 wherein said spacer tubes are flared outwardly at one end to provide a frusto conical inner guide surface and said method further includes the step of positioning said tubes on said stem members between said limb members with all of the flared ends of said tubes oriented in the same direction.

5. The method of manufacturing artificial shrubbery as claimed in claim 2 wherein said tubes have one end flared radially outwards to define a frusto conical inner guide surface and said method further includes the step of orienting the tubes on the stem members such that their flared ends are all oriented in the same direction.

6. Artificial shrubbery comprising: a vertically extending trunk member consisting of a plurality of stiffly flexible intertwisted wire rods, a plurality of radially extending limb assemblies formed of twisted wire and filament brush material, carried by said trunk member and extending between said twisted wire rods at longitudinally spaced positions, and flexible tubes concentrically carried by said intertwisted wire rods intermediate of said spaced, radially extending limb assemblies to stimulate the bark of the shrubbery.

7. The artificial shrubbery as claimed in claim 6 further comprising an electrical insulator sheet wrapped about each radially extending limb assembly in the area of contact with said intertwisted wire rods to electrically insulate the respective limb assemblies from said intertwisted wire rods.

8. The artificial shrubbery as claimed in claim 7 wherein the radially extending limb assemblies have portions extending on either side of said intertwisted wire rods with the section of said radially extending limb assembly in contact with said twisted wire trunk member being free of filaments to facilitate reception of said electrical insulator sheet.

9. An artificial shrub comprising: a cylindrical trunk member with its axis generally oriented in a vertical direction, a plurality of limb assemblies comprising a main limb having a hooked upper end and carrying at spaced longitudinal positions, cross limbs extending outwardly therefrom and to one side thereof to form a frusto conical sector and means carried by said trunk member for suspending said sector shaped, hooked limb assemblies in a complete circumferential array about said vertically extending trunk member, with the major portion of said main limb extending generally downwardly and outwardly of said trunk member.

10. The shrub of claim 9 wherein the cross limbs are essentially of the same length.

11. The shrub as claimed in claim 9 wherein said means for suspending said limb assembly comprises a plurality of short tubular members circumferentially spaced about and fixed to said trunk member with the axis of said tubular members parallel to the axis of said trunk member.

12. The shrub as claimed in claim 9 wherein each limb assembly comprises a main limb formed by intertwisted wire rods and carries at spaced longitudinal positions cross limbs separated by flexible spacer tubes defining the location of said cross limbs on said intertwisted wire rods nad simulating the bark of shrubbery.

13. The shrub as claimed in claim 11 wherein said trunk comprises a metal tube and said shrubbery further comprises a conical, multi-limbed tree top having its bared bottom end received within the open end of said tubular tree trunk.

14. The shrubs as claimed in claim 11 wherein each limb assembly comprises a main limb formed by intertwisted wire rods and carries at spaced longitudinal positions cross limbs separated by flexible spacer tubes defining the location of said cross limbs on said intertwisted wire rods and simulating the bark of shrubbery.

15. The shrub as claimed in claim 14 wherein the upper ends of said short tubular members are beveled downwardly and outwardly for preventing rotation of said hooked ends of said limb assemblies carried thereby.

References Cited

UNITED STATES PATENTS

| | | | |
|---|---|---|---|
| 3,278,364 | 10/1966 | Diffenbach | 161—22 |
| 3,064,379 | 11/1962 | Hertzberg | 161—24 |
| 3,244,577 | 4/1966 | Raymond | 161—22 |
| 3,234,073 | 2/1966 | Raymond et al. | 161—24 |
| 1,683,637 | 9/1928 | Trimpe | 161—17 |

PHILIP DIER, Primary Examiner

U.S. Cl. X.R.

156—148; 140—149